(12) United States Patent
Saunderson

(10) Patent No.: US 8,712,814 B1
(45) Date of Patent: Apr. 29, 2014

(54) SYSTEMS AND METHODS FOR ECONOMIC RETIREMENT ANALYSIS

(75) Inventor: Christopher S. Saunderson, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1767 days.

(21) Appl. No.: 11/765,495

(22) Filed: Jun. 20, 2007

(51) Int. Cl.
 *G06Q 10/00* (2012.01)

(52) U.S. Cl.
 USPC ............................................. 705/7.11

(58) Field of Classification Search
 USPC ................................. 705/7.11, 305
 See application file for complete search history.

(56) References Cited

U.S. PATENT DOCUMENTS

| | | | |
|---|---|---|---|
| 5,331,579 A * | 7/1994 | Maguire et al. ................... | 703/2 |
| 2003/0114105 A1 * | 6/2003 | Haller et al. ..................... | 455/41 |
| 2003/0149548 A1 * | 8/2003 | Mosses et al. ................. | 702/184 |
| 2004/0015377 A1 * | 1/2004 | Hostetler .......................... | 705/7 |
| 2005/0143956 A1 * | 6/2005 | Long et al. ..................... | 702/184 |
| 2006/0085278 A1 * | 4/2006 | Shimoda et al. ................ | 705/26 |
| 2011/0239189 A1 * | 9/2011 | Attalla .......................... | 717/121 |

\* cited by examiner

*Primary Examiner* — Johnna Loftis

(57) ABSTRACT

Systems and methods for economic retirement analysis are disclosed. In some embodiments, the method comprises identifying an existing component and at least one potential replacement component, estimating costs associated with the existing component and the at least one potential replacement component, calculating an economic retirement date for the existing component and an acquisition cost recovery date for the at least one potential replacement component, and storing the economic retirement date and the acquisition cost recovery date. Some system embodiments comprise a first memory that stores economic retirement software, a second memory that stores cost data in association with a component, and a processor that executes the economic retirement software. The economic retirement software configures the processor to calculate an economic retirement date of the existing component and store the economic retirement date.

15 Claims, 5 Drawing Sheets

SYSTEMS AND METHODS FOR ECONOMIC RETIREMENT ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO MICROFICHE APPENDIX

Not applicable.

BACKGROUND

Too often an enterprise initiates plans for replacing existing hardware, software, or systems including hardware and/or software when the vendor of such components ceases to support its product. The date when a vendor ceases to support its product may be defined as the product's end of life. Initiating a replacement plan for a component at its end of life results in an interruption due to the unavailability of the component and a replacement for it to individuals and/or systems dependent upon the component.

To avoid these interruptions, some enterprises initiate a replacement plan for the component at the component's retirement date. The retirement date occurs before the end of life and is determined by the end of life less the amount of time needed to acquire a replacement component, install and test it, and move all necessary files and data, if any, onto it such that there is no interruption due to the transition from the existing component to its replacement for individuals and/or systems dependent on the component. For example, Mar. 1, 2007 may be the end of life for a particular server. Acquiring a suitable replacement for that server, installing and testing the replacement, and moving files and data from the existing server to the replacement server may require two months to perform. Thus, it is necessary to initiate acquisition of the replacement server on Jan. 1, 2007, the retirement date of the existing server, in order to prevent interruptions due to the unavailability of the existing server and its replacement.

Although initiating a replacement plan for a component at its retirement date eliminates interruptions caused by unavailability of the component, delaying action until the retirement date may still be economically undesirable. As a component nears its end of life, its vendor may begin to charge more for continued support of the component that will soon be obsolete. Thus, the cost to the enterprise for maintaining the existing component begins to rise. At some point in time thereafter, the maintenance cost for the existing component may exceed a similar cost for a suitable and available replacement component. If so, the enterprise begins to lose money beyond this date by continuing to maintain the existing component when a suitable replacement with a lower maintenance cost is available.

SUMMARY

Systems and methods for hardware economic retirement analysis are disclosed. In some embodiments, the method comprises identifying an existing component and at least one potential replacement component, estimating costs associated with the existing component and the at least one potential replacement component, calculating an economic retirement date for the existing component and an acquisition cost recovery date for the at least one potential replacement component, and storing the economic retirement date and the acquisition cost recovery date. The economic retirement date is defined as the date when the maintenance cost for the existing component exceeds the sum of the maintenance cost and porting cost for the at least one potential replacement component. The acquisition cost recovery date is defined as the date when savings due to the difference between the maintenance cost of the existing component and the maintenance cost of the at least one potential replacement component exceeds the sum of the acquisition cost and the porting cost for the at least one potential replacement component.

Some system embodiments comprise a first memory that stores economic retirement software, a second memory that stores cost data in association with a component, and a processor that executes the economic retirement software. The economic retirement software configures the processor to receive data identifying an existing component and at least one potential replacement component and information that determines the costs associated with the existing or the at least one potential replacement component, calculate an economic retirement date for the existing component, and store the economic retirement date in the second memory.

Some method embodiments comprise identifying an existing component and at least one potential replacement component, estimating a maintenance cost for the existing component and a maintenance cost and a porting cost for the at least one potential replacement component, calculating an economic retirement date for the existing component, and storing the economic retirement date.

These and other features will be more clearly understood from the following detailed description taken in conjunction with the accompanying drawings and claims.

Figure 1:
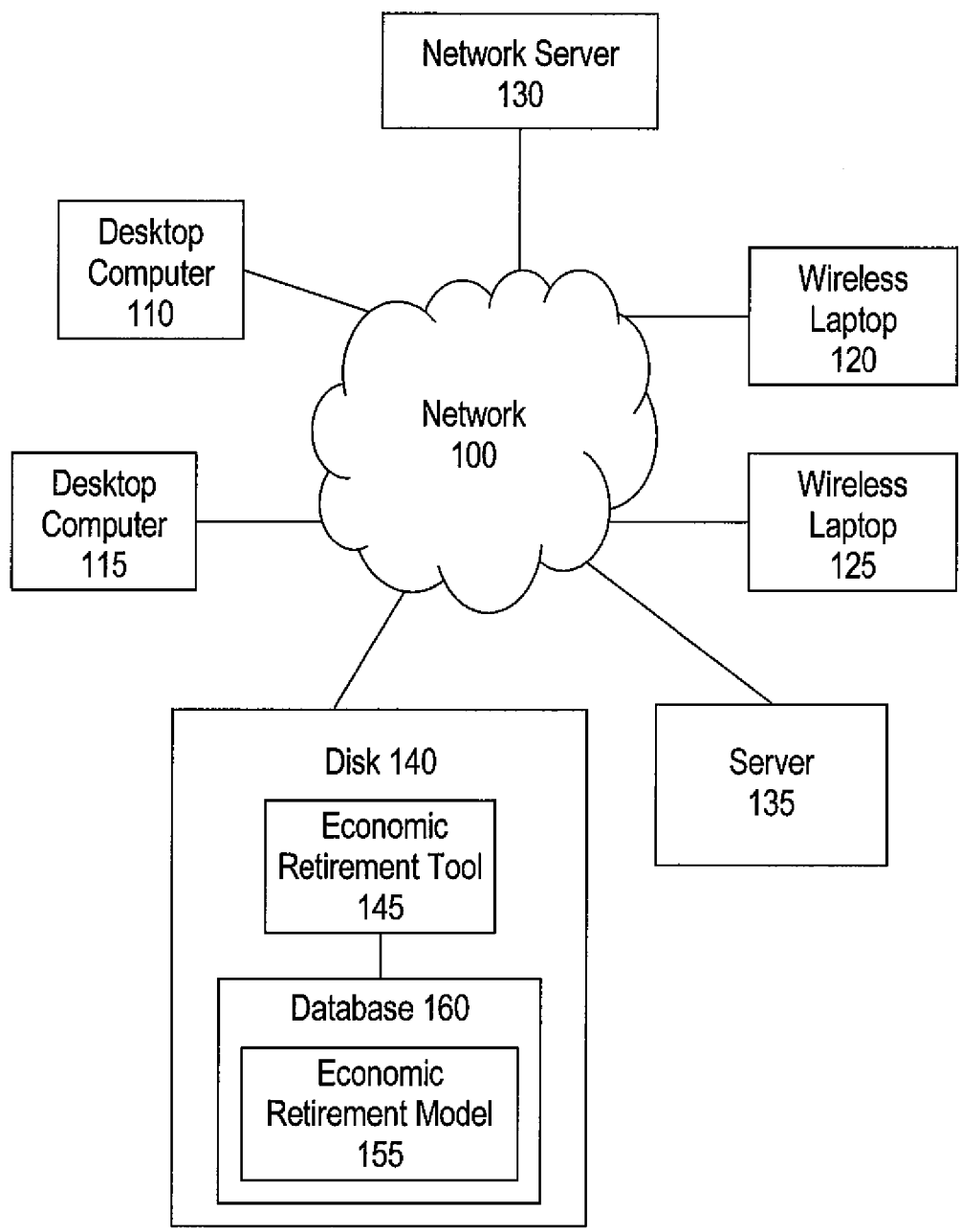
FIG. 1 is a block diagram of an illustrative economic retirement analysis system.

Various embodiments of the invention will now be described with reference to the accompanying drawings, wherein like reference numerals are used for like features throughout the several views. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to suggest that the scope of the disclosure, including the claims, is limited to that embodiment.

NOTATION AND NOMENCLATURE

Certain terms are used throughout the following description and claims to refer to particular components. This document does not intend to distinguish between components that differ in name but not function. In the following discussion and claims, the terms "including" and "comprising" are used in an open-ended fashion, and thus should be interpreted to mean "including, but not limited to . . . ".

As used herein, the term "component" refers to software, hardware used to execute software, and systems including software and/or hardware.

DETAILED DESCRIPTION

A computer-based system for implementing methods for economic retirement analysis permits a process for identifying economically viable potential replacement components for existing components, determining when it is desirable to make the replacements so as to minimize the cost incurred by an enterprise to maintain the components, and displaying and storing the analysis results for subsequent use in making decisions regarding replacement of the existing components. The existing component may be hardware, software, or a system including hardware and/or software. For the sake of clarity, the methods for economic retirement analysis are described with reference to a single existing component and one or more potential replacements for it. However, the methods may also be used to perform a collective analysis of multiple existing components, or even an entire class of existing components, e.g. all servers of a particular type.

The method's reliance on the economic retirement date and the acquisition cost recovery date provide the bases for identifying which potential replacement components are economically viable and determining when each should be installed to minimize maintenance cost to the enterprise. The economic retirement date is the date when the maintenance cost for the existing component exceeds the maintenance and porting costs for a potential replacement component. The acquisition cost recovery date is the date when the savings experienced due to the lower maintenance cost of the replacement component exceeds the acquisition and porting costs of the replacement component.

The method's reliance on normalized cost incurred to the enterprise to maintain the component provides the basis for ranking the economically viable replacement components in order of cost-wise preference, as well as identifying the preferred replacement component. Moreover, the method's reliance on the existing component's retirement date provides the basis for ensuring that the acquisition of the replacement component is initiated in time to allow installation of the replacement component prior to the existing component's end of life, thereby eliminating interruptions caused by the unavailability of the existing component and a replacement for it.

To capitalize on these potential benefits, systems and methods for economic retirement analysis are disclosed. Using the disclosed methods, a business unit identifies an existing component to be replaced, defines its end of life, and defines information with which its maintenance cost through its end of life may be determined. The business unit also identifies one or more components that may replace the existing component and defines similar information for each. Also for each potential replacement component, the business unit defines its acquisition cost, its porting cost, and the retirement date of the existing component in view of the replacement component.

Based on information provided by the business unit, the economic retirement date of the existing component in view of each potential replacement component, the acquisition cost recovery date for each potential replacement component, and economically viable potential replacement components, if any, are determined. The economically viable potential replacement components, if any, are then ranked in order of cost-wise preference and the preferred replacement component identified. These analysis results are then displayed and stored for subsequent use in making decisions regarding replacement of the existing component.

Computer-based systems are disclosed for implementing this methodology. A business unit, using a computer-interface, accesses a computer-based software tool that, in turn, accesses a database where an economic retirement model is stored. Using this software tool, the business unit defines the existing component, its end of life, and information that may be used to calculate its associated maintenance costs, including those for power, floor space, and software. Also using this tool, the business unit defines one or more potential replacement components and for each, its end of life, the retirement date of the existing component in view of the replacement component, and information with which to calculate the replacement component's associated costs, including the maintenance costs listed above and its acquisition and porting costs. Information defined in this manner is stored in the economic retirement model.

The software tool then performs calculations to identify which, if any, of the potential replacement components are economically viable, to rank the economically viable potential replacement components in order of cost-wise preference, and to determine when each potential replacement component should be installed so as to minimize the cost incurred by the business unit to provide continuous, uninterrupted availability of the component. Lastly, the software tool displays and stores these analysis results for subsequent use in making decisions regarding replacement of the existing component.

FIG. 1 depicts a system that may be used to implement the disclosed methods for economic retirement analysis. This figure shows an illustrative computer network 100 comprising multiple desktop computers 110, 115, wireless laptops 120, 125, and servers 130, 135, all in communication with each other. All of these computers 110, 115, 120, 125, 130, 135 have access through the network 100 to an external disk 140, where a software tool 145, hereafter referred to as the economic retirement tool 145, and a database 160 are stored. Although FIG. 1 depicts disk 140 both as an external disk, in some embodiments this disk 140 may be an internal disk residing on one or more servers 135.

The economic retirement model 155 is stored in the database 160 located on storage disk 140. The economic retirement tool 145 provides an interface between computers 110, 115, 120, 125 and the economic retirement model 155. Computers 110, 115, 120, 125 are used to access the economic retirement tool 145 and direct the tool 145 to access the economic retirement model 155. In this manner, authorized entities, including business units and architects, access, input, update, modify, store, and delete the economic retirement model 155, or elements thereof, and report, by graphical display on a computer 110, 115, 120, 125 monitor and hard copy print out, the economically viable potential replacement components, their ranking in order of cost-wise preference, and when each should be installed so as to minimize maintenance cost incurred by the business unit.

The objectives of the economic retirement model 155 are to identify economically viable potential replacement components in order of cost-wise preference from identified potential replacement components and a date when each should be installed so as to minimize maintenance cost to the business unit. To achieve these objectives, the model 155 comprises a number of elements, all associated with an existing component, whether software, hardware, or a system including software and/or hardware, or one or more replacement components. For each component, whether existing or a potential replacement, a unique identifier is stored in the model 155. By way of example, a potential replacement server may be designated by its vendor and model number, e.g. "Sun 450". Information relating to each component is associated with its unique identifier and stored in the model 155. This information includes the end of life, retirement date, and costs associated with the component, such as but not limited to acquisition cost, porting cost, power cost, maintenance cost, software cost, floor cost, and personnel cost.

The software cost is the cost for supporting software, if any, needed to use the component. For example, the hypothetical Sun 450 server mentioned above may require that an operating system be purchased and installed on the server prior to users accessing and using the server. The cost to acquire the operating system is, thus, a software cost for the Sun 450 server.

The acquisition cost for a component is its purchase price less any discount offered by its vendor that is attributable to the component and reductions in maintenance cost due to a reduction in supporting software, if any, needed for the component. For instance, the business unit may receive a discount for a bulk purchase of more than one particular component. Thus, the acquisition cost for the component is reduced by the amount of discount attributable to the component. For example, the Sun 450 server may cost $10,000 on an individual basis. However, its vendor may offer a 10% discount when the business unit purchases three or more Sun 450 servers. If so, the acquisition cost for a single Sun 450 server is $9,000, not $10,000, assuming the business unit purchases at least three of these servers.

Also, a replacement component may require less software than the existing component. Thus, the acquisition cost for the replacement component is reduced by an amount equal to the reduction in software cost. For example, the Sun 450 server may require the maintenance of two software licenses to support it while the existing server may require six such software licenses. By comparison, replacing the existing server with the Sun 450 server will permit a reduction in software licenses needed to support the component by four. Therefore, the acquisition cost for the replacement Sun 450 server includes a "credit" in an amount equal to licensing fees for four software licenses.

The porting cost is the manpower cost for decommissioning the existing component, installing and testing the replacement component, including all supporting software, and moving files and data, if any, onto the replacement component. The power cost is the cost for providing electricity to power the component. The floor cost is the expense associated to the component based on it occupying floor space in a building, warehouse, or other structure. The personnel cost is the manpower cost to the business unit to maintain and use a component. The maintenance cost for a component is the cost incurred by the business unit in order to maintain and use the component and may include power cost, floor cost, software cost, including software licensing fees, fees charged by the vendor to maintain or service its product, and the personnel cost.

Some component costs may be provided to the model 155 as a flat number, e.g. $10,000, requiring no further manipulation. Alternatively, a component cost may be calculated by the model 155 as a function of another parameter, such as a design feature of the component, local electricity rate, or floor tile cost. In this situation, information needed to calculate the component cost is also stored in the model 155 so that the model 155 may calculate the particular cost. For example, the cost for software to support the Sun 450 server may be computed as a function of the server's CPU. Thus, the number of CPU's housed within the Sun 450 server may be stored in the model 155 in association with this server and used by the model 155 to compute the software cost for this server.

As another example, the floor cost to house the Sun 450 server may be computed as a function of the space occupied by the server, the floor tile cost, and the total floor area of the building, warehouse, or other structure used to house the server, where the floor tile cost is the cost incurred to the business unit in order to use the building space and may include rent and utility expenses. Thus, the floor space occupied by the server, the total floor are of the building, and the floor tile cost may be stored in the model 155 in association with this server and used by the model 155 to compute the floor cost for this server.

As still another example, the power cost for the Sun 450 server may be computed as a function of its power consumption rating, e.g. 610 W, and the local electricity rate, e.g. $0.05/kW-hr. Thus, the power consumption rating of the server and the local electricity rate may be stored in the model 155 in association with this server and used by the model 155 to compute the power cost.

Also, a cost may be provided to the model 155 and/or computed by the model 155 as a total or on a monthly, yearly, or other periodic basis, such as the period of time between installation and end of life. A cost provided on a periodic basis may be converted by the model 155 to a total cost by multiplying the periodic cost by the time period of interest, e.g. $2000/month*10 months equals a total cost of $20,000 for the 10 month period. A cost provided as a total may be converted by the model 155 to a periodic cost by dividing by the time period of interest, e.g. $20,000/10 months equals a periodic cost of $2000/month for the 10 month period assuming a uniform cost distribution over that time period. Typically acquisition cost is expressed as a total cost, while power, floor, and maintenance costs are expressed on a monthly basis. These costs, however, may be converted from total to periodic costs, and vice versa, as needed by the model 155.

Figure 2:
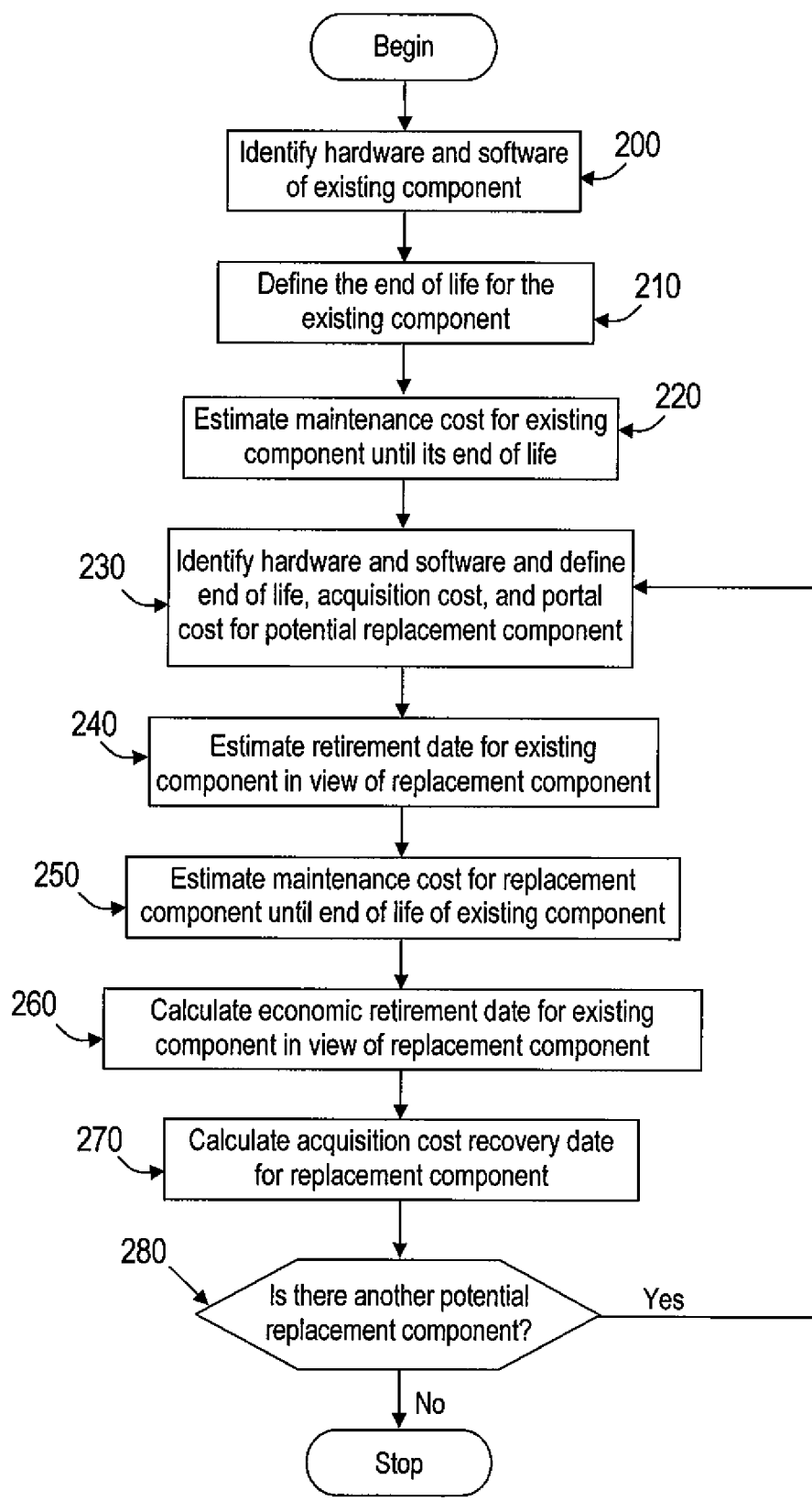
FIG. 2 is a logic diagram of an illustrative method implemented by the economic retirement analysis system to identify and define an existing component and potential replacements for it.

Referring next to FIG. 2, a flowchart is provided to illustrate various method embodiments for economic retirement analysis. Specifically, the embodiments illustrated by FIG. 2 define an illustrative method for identifying existing and potential replacement components and defining and/or calculating all parameters needed to determine which potential replacement components are economically viable in view of the existing component. These method embodiments begin when a business unit, meaning an individual within the business unit, accesses the economic retirement tool 145 using a computer 110, 115, 120, 125. Individual access to this tool 145, and thus economic retirement model 155, may be limited to authorized individuals by means of userid and password protection. Moreover, individual access to elements or parts of the economic retirement model 155 may be limited depending on the user's identification. For example, architects may have the ability to modify the structure of the model 155, while individual business units may be restricted to simply defining or inputting information related to the existing and potential replacement components.

Having accessed the tool 145, the user identifies the existing component by defining a unique identifier and, in association with that identifier, all parameters related to the existing component needed to compute its maintenance cost until its end of life (block 200). By way of example, the user may elect to provide an identifier that combines the vendor name and the component model number, such as "Sun 450". The user may need to specify, for example, the power consumption rate for the component and the rate charged for electricity so the model 155 may calculate the power cost for the existing component, which contributes to the maintenance cost of that component. Similarly, the user may need to specify, for example, the floor tile cost and the square footage of floor space occupied by the component so the model 155 calculate the floor cost, which also contributes to the maintenance cost for the existing component. Information defined by the user is stored in the database 160 as part of the economic retirement model 155.

Next, the user defines the end of life for the existing component (block 210), where the end of life is the date when the vendor of the component ceases to support that component. This date is associated with the unique identifier defined by the user for the existing component (recall block 200) and stored in the database 160 as part of the economic retirement model 155.

Using the information provided to the model 155 by the user (recall blocks 200, 210), the model 155 then calculates the maintenance cost for the existing component on a monthly basis through its end of life (block 220). The maintenance cost is the sum of costs incurred by the business unit to use the existing component and includes the power cost, floor cost, software cost, and fee charged by the component's vendor to service the component. Since the maintenance fee charged by a vendor for continued support of its product often begins to increase as that product nears its end of life, the monthly maintenance cost for the existing component can be expected to increase from month to month as the component nears its end of life.

Next, the user identifies a potential replacement component by defining a unique identifier for it and, in association with that identifier, all parameters related to the potential replacement component needed to compute its maintenance cost until its end of life, the replacement component's end of life, its acquisition cost, and its porting cost (block 230). As described earlier, the acquisition cost for a component is its purchase price less any discount offered by the vendor, for instance a bulk purchase discount, that is attributable to the component and reductions in maintenance cost due to a reduction in supporting software, if any, needed for the component. The porting cost is the manpower cost for decommissioning the existing component, installing and testing the replacement component, including installation and testing of all necessary software, and moving files and data, if any, from the existing, now decommissioned, component to its replacement. Information defined by the user is associated with the potential replacement component and stored in the database 160 as part of the economic retirement model 155.

The user then defines the retirement date of the existing component in view of the replacement component (block 240). As defined earlier, the retirement date of a component is the date when the vendor of the component ceases to support that component less the amount of time needed to acquire a replacement component, install and test the replacement, and move all necessary files and data, if any, onto the replacement such that there is no interruption due to the transition from the existing component to its replacement for individuals and/or systems dependent on the component. This date is associated with the potential replacement component and stored in the database 160 as part of the economic retirement model 155.

Since the amount of time needed to acquire and install each potential replacement component may vary from one component to the next, the retirement date of the existing component may also vary depending on the potential replacement component. For example, potential replacement component A may require 8 months from the time of purchase to be delivered and installed, while potential replacement component B may require only 4 months. Thus, the retirement date for the existing component in view of component A is the existing component's end of life less 8 months, while in view of component B, the retirement date is the existing component's end of life less 4 months. The retirement date is significant because it determines the latest possible date when acquisition of the replacement component must be initiated in order to avoid an interruption during transition from the existing component to its replacement. In these examples, acquisition of replacement component A should be initiated at least 8 months before the existing component's end of life, while similar action to acquire component B should be initiated at least 4 months prior to the existing component's end of life.

Using the information provided to the model 155 by the user (recall blocks 230, 240), the model 155 calculates the maintenance cost for the replacement component on a monthly basis through the existing component's end of life (block 250). The maintenance cost is the sum of costs that will be incurred by the business unit to use the replacement component and includes the power cost, floor cost, software cost, and fee charged by the component's vendor to service the component. Since the maintenance fee charged by a vendor for support of its product often remains steady during the initial period of the component's life, the monthly maintenance cost for the replacement component can be expected to remain relatively constant from month to month during the period of time between the replacement component's installation and the existing component's end of life.

Using the maintenance cost calculated for the existing component (recall block 220), the maintenance cost calculated for the potential replacement component (recall block 250), and the porting cost defined for the potential replacement component (recall block 230), the economic retirement model 155 calculates the economic retirement date for the existing component in view of the potential replacement component (block 260). This date is associated with the potential replacement component and stored in the database 160 as part of the economic retirement model 155.

The economic retirement date for the existing component in view of a potential replacement component is the date when the maintenance cost for the existing component exceeds the sum of the maintenance and porting costs for the potential replacement component. For example, assume that the maintenance cost for the existing component is $2000/month and rising $500/month as the component nears its end of life, the maintenance cost for the potential replacement component is steady at $1500/month, the porting cost for the potential replacement component is $1800, and the economic retirement date is calculated at time zero. As illustrated by the calculations below, the economic retirement date of the existing component in view of the potential replacement component occurs during the third month measured from time zero.

| | Maintenance Cost | | |
| --- | --- | --- | --- |
| Component | Month 1 | Month 2 | Month 3 |
| Existing | $2000 | $2000 + $2500 = $4500 | $4500 + $3000 = $7500 (>$6300) |
| Replacement | $1500 + $1800 = $3300 | $3300 + $1500 = $4800 | $4800 + $1500 = $6300 |

Thus, it is economically desirable to replace the existing component with the replacement component during the fourth month in order to minimize the cost incurred to the business unit to maintain the component. Note that this calculation considers the porting cost associated with the replacement component. In other words, replacing the existing component with the replacement component during the fourth month is economically beneficial to the business unit, even considering the manpower cost incurred by the business unit to make the replacement.

Assuming the potential replacement component is installed to replace the existing component at the economic retirement date (recall block 260), the model 155 calculates the acquisition cost recovery date for the replacement component (block 270). The acquisition cost recovery date is defined as the date when the savings experienced due to the lower maintenance cost of the replacement system exceeds the acquisition and porting costs of the replacement system. The acquisition cost recovery date provides a means of determining when the business unit has recovered the cost of the replacement component, both its acquisition cost and the manpower cost to install it. Beyond the acquisition cost recovery date, the business unit increases its profits by an amount equal to the difference between the maintenance cost of the existing component, which has been replaced, and the maintenance cost of the replacement component. The acquisition cost, porting cost, and the reduction in maintenance cost for each potential replacement component may be different. Thus, the acquisition cost recovery date may vary for each potential replacement component.

If there is more than one potential replacement component, the method is repeated for each potential replacement component (block 280). As before, the user identifies a potential replacement component by defining a unique identifier for it and, in association with that identifier, all parameters related to the potential replacement component needed to compute its maintenance cost until its end of life, its end of life, its acquisition cost, and its porting cost (block 230). The user also defines the retirement date for the existing component in view of the replacement component (block 240). The maintenance cost for the replacement component through its end of life is estimated on a monthly basis (block 250). The economic retirement date for the existing component in view of the replacement component and the acquisition cost recovery date for the replacement component are calculated (blocks 260 and 270).

Figure 3:
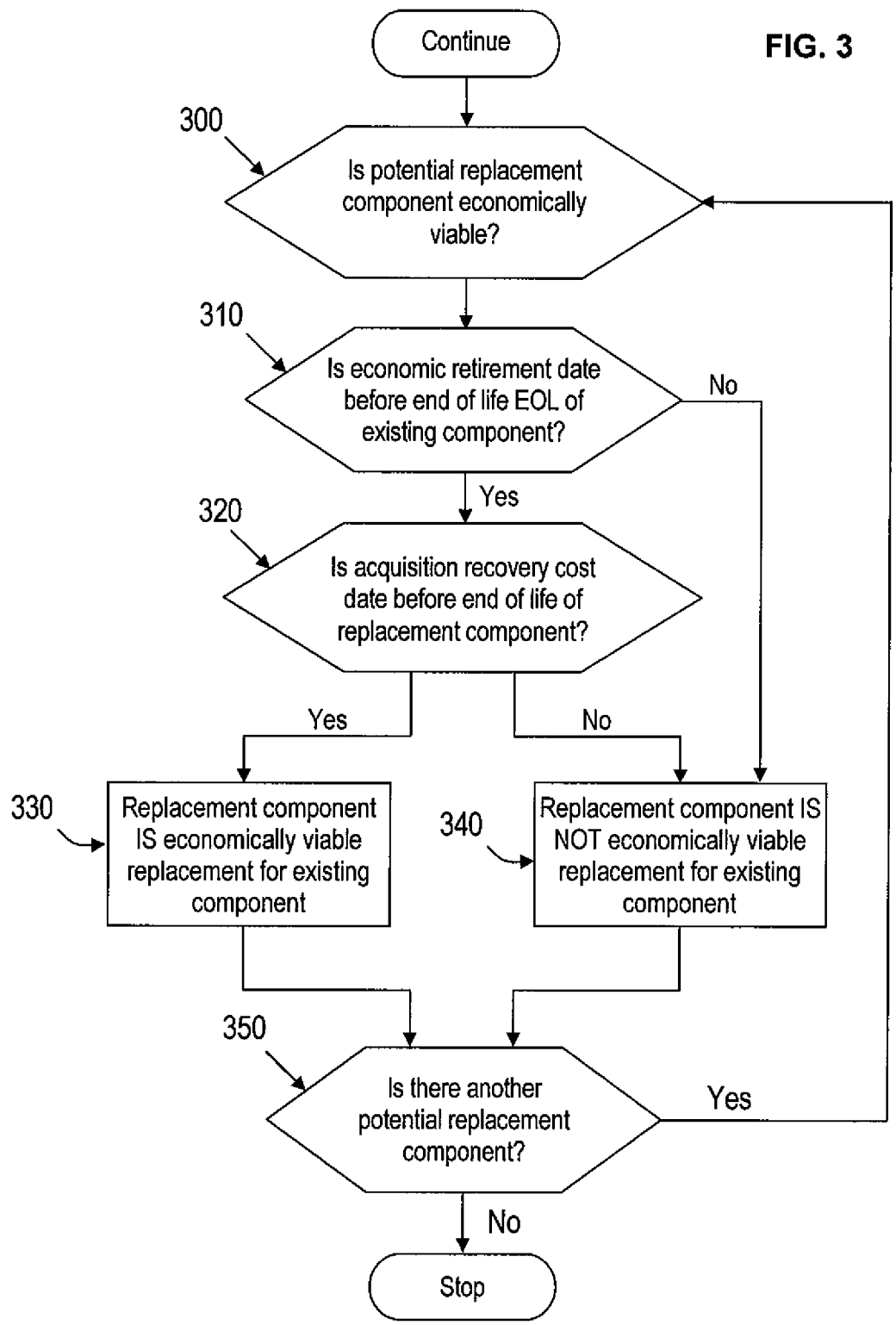
FIG. 3 is a logic diagram of an illustrative method to identify which potential replacement components are economically viable.

The economic retirement date and acquisition cost recovery date provide the bases for determining which of the potential replacement components are economically viable, meaning that replacing the existing system at the economic retirement date with the potential replacement component will yield savings to the business unit that it will not otherwise experience. The economic retirement date also determines when the potential replacement component should be installed to minimize maintenance cost to the business unit. Turning to FIG. 3, a flowchart is provided to illustrate various method embodiments for economic retirement analysis. Specifically, the embodiments illustrated by FIG. 3 define an illustrative method for determining which of the potential replacement components identified (recall block 230) are economically viable (block 300).

The economic retirement date provides a means for determining when the business unit will experience savings due to a lower maintenance cost by replacing the existing component with a potential replacement component (block 310). If the economic retirement date is later than the existing component's end of life, the business unit will not experience any savings due to lower maintenance cost by replacing the existing component with the replacement component. In fact, the replacement component will cost the business unit more than the existing component, whether due to a higher maintenance cost, the manpower cost to make the replacement, or both. Thus, the replacement component is not economically viable (block 340). Otherwise, if the economic retirement date is sooner than the existing component's end of life, the business unit will experience savings due to lower maintenance cost by replacing the existing component, even considering the porting cost for making the replacement. Thus, the replacement component may be economically viable.

The acquisition cost recovery date provides a means to determine whether the business unit will recover the acquisition and porting costs of a replacement component before its end of life (block 320). Recovery of the acquisition cost of the replacement component prior to its end of life is desirable because the business unit may realize savings, or higher profits, after the acquisition cost is recovered. If this cost cannot be recovered until after the replacement component has reached its end of life, the cost to acquire the replacement component exceeds any savings due to lower maintenance cost experienced by the business unit. Thus, the replacement component is not economically viable (block 340). Otherwise, if the acquisition cost recovery date occurs before the end of life of the replacement component and the economic retirement date occurs before the end of life of the existing component (recall block 310), the replacement component is economically viable (block 330). If there is more than one potential replacement component, the method is repeated for each potential replacement component (block 350).

Figure 4:
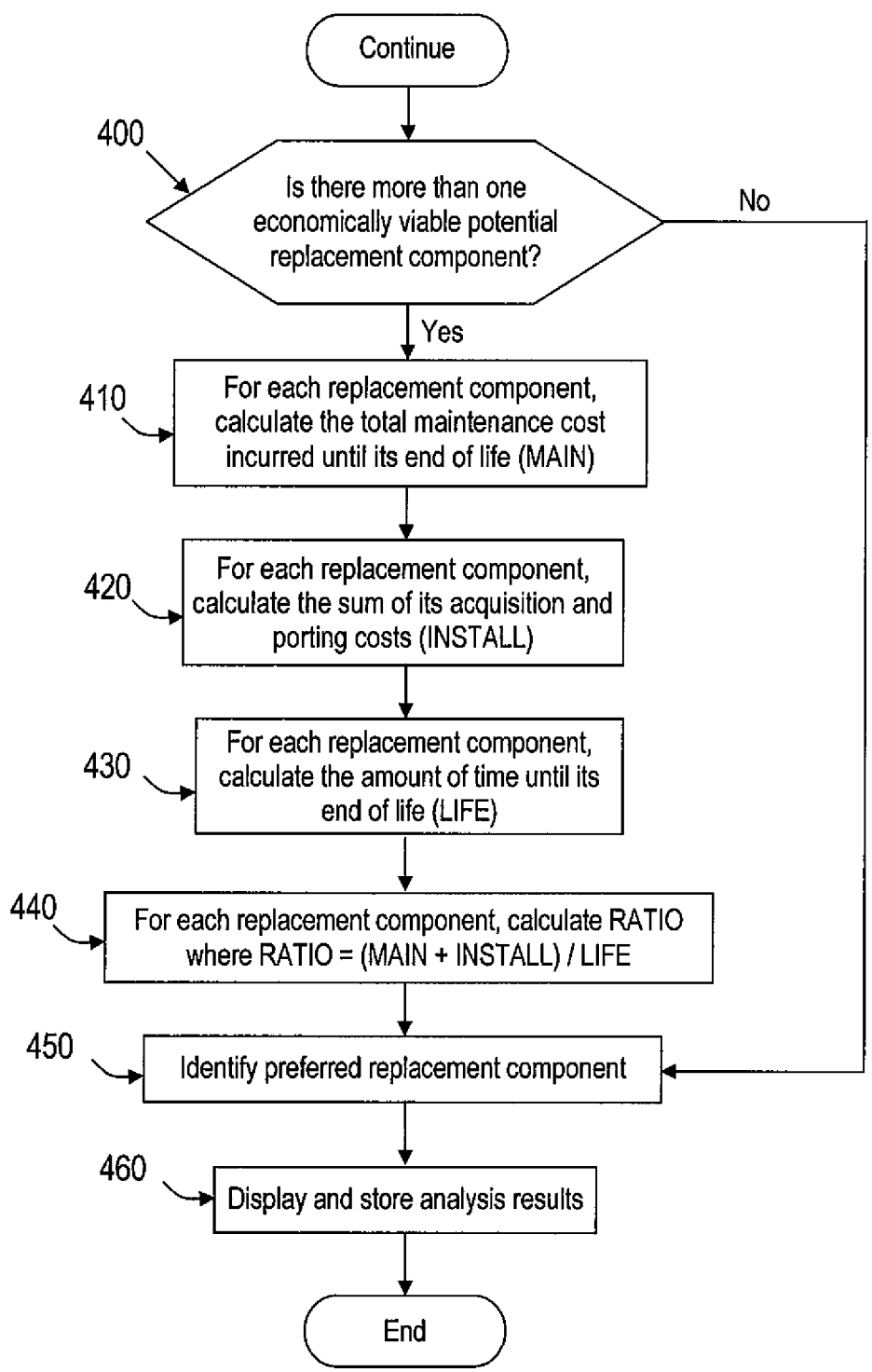
FIG. 4 is a logic diagram of an illustrative method to identify the preferred replacement component.

Having identified economically viable potential replacement components (recall block 330) from all identified potential replacement components (recall block 230), the model 155 identifies the preferred replacement component from those replacement components determined to be economically viable as well as ranks all economically viable replacement components in order of cost-wise preference. Referring to FIG. 4, the method continues by determining whether there was more than one economically viable replacement component identified (recall 330) (block 400). If not, the preferred replacement component, if one exists, may be immediately identified (block 450). If none of the potential replacement components identified (recall block 230) is determined to be economically viable (recall block 330), the existing component should not be replaced with any identified potential replacement component prior to the existing component's end of life. If, however, a single economically viable potential replacement component is identified (recall block 330), the existing component should be replaced by that replacement component at the economic retirement date (recall block 260).

If more than one economically viable potential replacement component exists (block 400), the model 155 calculates, for each such replacement component, the total maintenance cost (MAIN) incurred to the business unit due for continued use of the existing component until the economic retirement date (recall block 260) and use of the replacement component from the economic retirement date until its end of life (block 410). MAIN represents the total maintenance cost incurred to the business unit to maintain the component from the time the economic retirement analysis is performed using the model 155 until the end of life of the replacement component.

The model 155 also calculates, again for each such replacement component, the sum of its acquisition and porting costs (INSTALL) (block 420). INSTALL represents the total cost to acquire and install the replacement component. The sum of MAIN and INSTALL represents the total cost incurred to the business unit to maintain the component from the time the economic retirement analysis is performed until the replacement component's end of life.

For each economically viable potential replacement component, the model 155 calculates the length of time between performing the economic retirement analysis and the replacement component's end of life (LIFE) (block 430). LIFE equals the length of time between performing the economic retirement analysis and the economic retirement date plus the length of time between the economic retirement date and the replacement component's end of life. Since each potential replacement component may have a different end of life, LIFE may vary from one replacement component to the next. LIFE provides a means for normalizing costs incurred to the business unit to maintain the component and may be expressed in days, months, or some other period of interest.

The model 155, also for each economically viable potential replacement component, calculates RATIO, where RATIO represents the normalized cost to the business unit to provide continued, uninterrupted availability of the component and equals (MAIN+INSTALL)/LIFE (block 440). The business unit seeks to minimize the cost to provide the component, and therefore RATIO. Thus, the value of RATIO determines the ranking of economically viable potential replacement components in order of cost-wise preference with the lowest value of RATIO identifying the preferred replacement component (block 450). This ranking provides the business unit with information it may evaluate in choosing a replacement component.

Lastly, the tool 145 displays the economic retirement analysis results generated by the model 155 to the monitor screen of the computer 110, 115, 120, 125 with which the user accessed the tool 145 (block 460). The user may elect to print the analysis results using printing options available within the tool 145. The tool 145 also stores the analysis results to database 160, as part of the model 155, separately from the model 155, or both. The user may use the displayed, printed, and/or stored analysis results to make subsequent decisions regarding replacement of the existing component.

As described above, the methods exemplified by FIGS. 2 through 4 may be applied to a single existing component to determine if or when it should be retired and replaced. These method embodiments may also be applied to more than one of the same existing component. For example, an enterprise may use many of the same type of server throughout its many facilities. At some point in time, the enterprise may consider replacing that particular server model enterprise-wide with another type of server. The methods described herein may be used to determine if and when such a replacement should be made and to identify viable replacements by performing a single analysis of all servers enterprise-wide matching the particular model number.

Also, these method embodiments may be used to perform a collective analysis of many dissimilar components. For example, an enterprise may wish to perform economic retirement analysis for all existing hardware, software, and systems containing hardware and/or software at a particular facility. Results from such an analysis may be useful to the enterprise when making decisions to eliminate the facility, for example.

Figure 5:
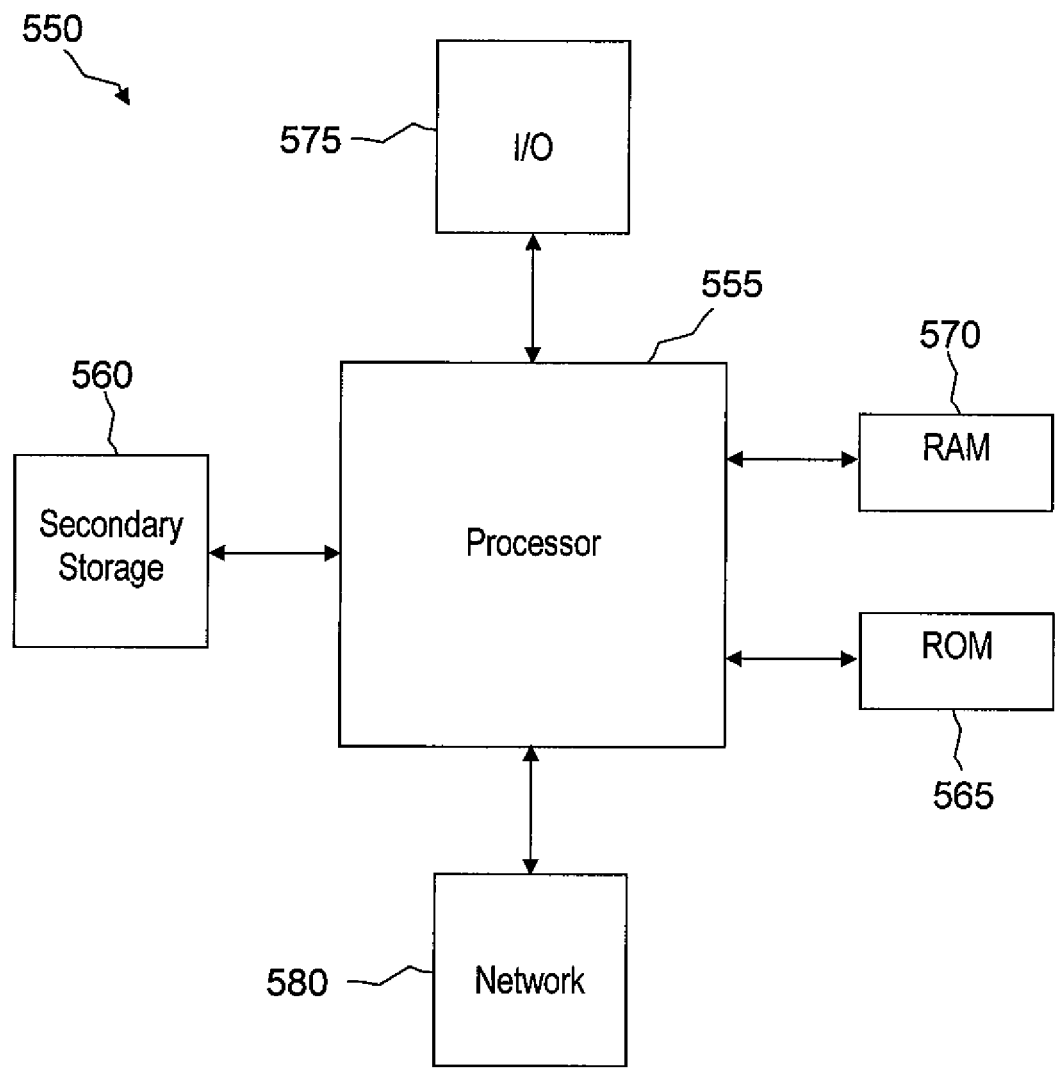
FIG. 5 is an illustrative general purpose computer system suitable for implementing the economic retirement analysis system.

The systems and methods described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 550 includes a processor 555 (which may be referred to as a central processor unit or CPU) that is in communication with memory devices including secondary storage 560, read only memory (ROM) 565, random access memory (RAM) 570, input/output (I/O) 575 devices, and network connectivity devices 580. The processor may be implemented as one or more CPU chips.

The secondary storage 560 is typically comprised of one or more disk drives or tape drives and is used for non-volatile storage of data and as an over-flow data storage device if RAM 570 is not large enough to hold all working data. Secondary storage 560 may be used to store programs that are loaded into RAM 570 when such programs are selected for execution. The ROM 565 is used to store instructions and perhaps data that are read during program execution. ROM 565 is a non-volatile memory device that typically has a small memory capacity relative to the larger memory capacity of secondary storage. The RAM 570 is used to store volatile data and perhaps to store instructions. Access to both ROM 565 and RAM 570 is typically faster than to secondary storage 560.

I/O 575 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 580 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 580 devices may enable the processor 555 to communicate with an Internet or one or more intranets. With such a network connection, it is contemplated that the processor 555 may receive information from the network, or may output information to the network in the course of performing the above-described method steps. Such information, which is often represented as a sequence of instructions to be executed using processor 555, may be received from and outputted to the network, for example, in the form of a computer data signal embodied in a carrier wave.

Such information, which may include data or instructions to be executed using processor 555 for example, may be received from and outputted to the network, for example, in the form of a computer data baseband signal or signal embodied in a carrier wave. The baseband signal or signal embodied in the carrier wave generated by the network connectivity 580 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 555 executes instructions, codes, computer programs, scripts that it accesses from hard disk, floppy disk, optical disk (these various disk based systems may all be considered secondary storage 560), ROM 565, RAM 570, or the network connectivity devices 580.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. An economic retirement analysis method that comprises:
   identifying an existing component and a potential replacement component, wherein each of the existing component and the potential replacement component are one of software, hardware used to execute software, or a system that includes software or hardware used to execute software;
   estimating costs associated with the existing component and the potential replacement component;
   calculating, by an economic retirement tool stored on a non-transitory computer readable medium and executed by a processor, an economic retirement date for the existing component in view of the potential replacement component, the economic retirement date defined as a date when a maintenance cost for the existing component exceeds the sum of a maintenance cost for the potential replacement component and a porting cost for the potential replacement component,
   calculating, by an economic retirement tool stored on a non-transitory computer readable medium and executed by a processor, an acquisition cost recovery date for the one potential replacement component, the acquisition cost recovery date defined as a date when savings due to a difference between the maintenance cost of the existing component and the maintenance cost of the potential replacement component exceeds the sum of an acquisition cost of the potential replacement component and the porting cost for the potential replacement component;
   storing the economic retirement date and the acquisition cost recovery date; and
   determining, by the economic retirement tool, that the potential replacement component is economically viable when the economic retirement date is sooner than an end of life for the existing component and when the acquisition recovery date occurs before an end of life of the potential replacement component, the end of life for the existing component is when a vendor ceases to support the existing component, and the end of life for the potential replacement component is when a vendor ceases to support the potential replacement component.

2. The method of claim 1, further comprising identifying a preferred potential replacement component.

3. The method of claim 1, wherein the costs comprise an acquisition cost, a porting cost, a maintenance cost, a software cost, a power cost, and a floor cost.

4. The method of claim 3, wherein the acquisition cost is a purchase price of a component less any discount and any reduction in software cost attributable to the component.

5. The method of claim 1, further comprising identifying a preferred replacement component as the potential replacement component determined to be economically viable with the lowest normalized cost.

6. The method of claim 1, further comprising calculating a retirement date and an acquisition cost recovery date for a plurality of potential replacement components.

7. The method of claim 6, further comprising determining a set of economically viable potential replacement components from the plurality of potential replacement components.

8. The method of claim 7, further comprising ranking the set of economically viable potential replacement components, wherein said ranking comprises:
   calculating, for each potential replacement component in the set of economically viable potential replacement components, a sum of:
      the maintenance cost for the existing component through an economic retirement date of the existing component for a corresponding potential replacement component in the set of economically viable potential replacement components;
      a maintenance cost for the corresponding potential replacement component in the set of economically viable potential replacement components;
      an acquisition cost for the corresponding potential replacement component in the set of economically viable potential replacement components;
      a porting cost for the corresponding potential replacement component in the set of economically viable potential replacement components;
   estimating a length of time for each potential replacement component in the set of economically viable potential replacement components until a vendor ceases to support the corresponding potential replacement component;
   dividing the sum for each potential replacement component in the set of economically viable potential replacement components by the length of time for each potential replacement component in the set of economically viable potential replacement components to yield a normalized cost for each potential replacement component in the set of economically viable potential replacement components; and
   sorting the set of economically viable potential replacement components in order of increasing normalized cost.

9. An economic retirement analysis system that comprises:
   a first memory that stores economic retirement software;
   a second memory that stores cost data associated with an existing component; and
   a processor configured to execute the economic retirement software, wherein the economic retirement software configures the processor to:
      receive data identifying the existing component and a potential replacement component and information that determines a cost associated with the existing component or the potential replacement component;

calculate an economic retirement date for the existing component, the economic retirement date defined as a date when a maintenance cost for the existing component exceeds a sum of a maintenance cost and a porting cost for the one potential replacement component;

calculate an acquisition cost recovery date of the potential replacement component, the acquisition cost recovery date defined as the date when savings due to the difference between the maintenance cost of the existing component and the maintenance cost of the potential replacement component exceeds the sum of an acquisition cost and a porting cost for the potential replacement component;

store the economic retirement date in the second memory; and determine that the potential replacement component is economically viable when the economic retirement date is sooner than an end of life for the existing component and when the acquisition cost recovery date occurs before an end of life of the potential replacement component, the end of life for the existing component is when a vendor ceases to support the existing component, and the end of life for the potential replacement component is when a vendor ceases to support the potential replacement component.

10. The system of claim 9, wherein the economic retirement software further configures the processor to generate a list of economically viable potential replacement components.

11. The system of claim 10, wherein the economic retirement software further configures the processor to:

rank the potential replacement components determined to be economically viable; and report the list of economically viable potential replacement components in order of increasing normalized cost, the normalized cost for each of the economically viable potential replacement components comprising a sum of a maintenance cost for a corresponding economically viable potential replacement component and a porting cost for the corresponding economically viable potential replacement component, divided by an estimate of a length of time until a vendor ceases to support the corresponding economically viable potential replacement component.

12. The system of claim 10, wherein the economic retirement software further configures the processor to report a retirement date for the existing component, the retirement date being a date when the vendor of the existing component ceases to support the existing component, less the amount of time needed to acquire the potential replacement component, install and test the potential replacement component, and move data and files, if necessary, onto the potential replacement component.

13. The system of claim 12, wherein the economic retirement software further configures the processor to report an acquisition date of when to initiate acquisition of the potential replacement component, the acquisition date defined as the earlier of the economic retirement date and the retirement date.

14. A method for economic retirement analysis that comprises:

identifying an existing component and a potential replacement component;

estimating a maintenance cost for the existing component and a maintenance cost and a porting cost for the potential replacement component;

calculating, by an economic retirement tool stored on a non-transitory computer readable medium, an economic retirement date for the existing component;

storing the economic retirement date, wherein the economic retirement date is defined as a date when a maintenance cost for the existing component exceeds a sum of a maintenance cost and a porting cost for the one potential replacement component;

determining, by the economic retirement tool, that the potential replacement component is economically viable when the economic retirement date is sooner than an end of life for the existing component and when the acquisition recovery date occurs before an end of life of the potential replacement component, the end of life for the existing component is when a vendor ceases to support the existing component, and the end of life for the potential replacement component is when a vendor ceases to support the potential replacement component; and ranking, by the economic retirement tool, the potential replacement component determined to be economically viable, wherein the ranking comprises:

calculating a sum of the maintenance cost for the existing component through the economic retirement date, the maintenance cost for the potential replacement component determined to be economically viable until a vendor of the potential replacement component ceases to support the potential replacement component, the acquisition cost for the potential replacement component determined to be economically viable, and a porting cost for the potential replacement component determined to be economically viable.

15. The method of claim 14, wherein the porting cost for the potential replacement component comprises a manpower cost for decommissioning the existing component, an installation cost for the potential replacement component, a testing cost for the replacement component, a software cost for the potential replacement component, and a file transfer cost for the potential replacement component.

* * * * *